(12) United States Patent
Dinon et al.

(10) Patent No.: US 11,053,389 B2
(45) Date of Patent: Jul. 6, 2021

(54) OXIDIZED CASHEW NUT SHELL LIQUID DERIVATIVES AND USES THEREOF

(71) Applicant: Cardolite Corporation, Monmouth Junction, NJ (US)

(72) Inventors: Francesca Dinon, Trieste (IT); Chetan Tambe, Solapur (IN); Pietro Campaner, Trieste (IT); Anbazhagan Natesh, North Wales, PA (US); Timothy Stonis, Newtown, PA (US)

(73) Assignee: CARDOLITE CORPORATION, Monmouth Junction, NJ (US)

( * ) Notice: Subject to any disclaimer, the term of this patent is extended or adjusted under 35 U.S.C. 154(b) by 135 days.

(21) Appl. No.: 16/106,627

(22) Filed: Aug. 21, 2018

(65) Prior Publication Data

US 2019/0127577 A1  May 2, 2019

Related U.S. Application Data

(60) Provisional application No. 62/577,804, filed on Oct. 27, 2017.

(51) Int. Cl.
| | |
|---|---|
| *C07C 33/20* | (2006.01) |
| *C08L 71/08* | (2006.01) |
| *C08G 14/06* | (2006.01) |
| *C08G 63/08* | (2006.01) |
| *C08G 65/22* | (2006.01) |
| *C08G 63/19* | (2006.01) |
| *C08G 64/02* | (2006.01) |

(52) U.S. Cl.
CPC .............. *C08L 71/08* (2013.01); *C08G 14/06* (2013.01); *C08G 63/08* (2013.01); *C08G 63/19* (2013.01); *C08G 64/0208* (2013.01); *C08G 65/22* (2013.01); *C08L 2203/30* (2013.01)

(58) Field of Classification Search
CPC ................. C07C 33/20; C07C 57/30
See application file for complete search history.

(56) References Cited

U.S. PATENT DOCUMENTS 9,187,603 B2    11/2015 Chen et al.
2017/0121268 A1 *   5/2017 Romeiro ................. C07C 59/64

FOREIGN PATENT DOCUMENTS

| JP | 2012-107009 | * | 6/2012 | |
| WO | WO-0146103 A1 | * | 6/2001 | .............. C07C 37/50 |
| WO | 2006003668 A1 | | 1/2006 | |
| WO | 2007077567 A1 | | 7/2007 | |
| WO | 2008131918 A1 | | 11/2008 | |

OTHER PUBLICATIONS

Graham, Journal of the American Oil Chemists' Society, 79, 725-732 (2002) (Year: 2002).*
Bolton, Biologically Active Derivatives of Cardanol: Antifungal 8-aryloctanoic Acids, Natural Product Letters, 4:3, p. 227-233 (1994) (Year: 1994).*
English Translation of JP 2012-107009 (Year: 2012).*
Lubi et al., "Cashew nut shell liquid (CNSL)—a versatile monomer for polymer synthesis" Designed Monomers and Polymers, (2000) 3:2, 123-153.
Madhusudhan et al., "Polyfunctional compounds from cardanol", Progress in Organic Coat&zgs, 20 (1992) 63-71.
Perdriau et al., "Selective Conversion of Polyenes to Monoenes by RuCl3-Catalyzed Transfer Hydrogenation: The Case of Cashew Nutshell Liquid", ChemSusChem (2012) 5, 2427-2434.
Non-final Office Action received in U.S. Appl. No. 16/128,971 dated Jan. 24, 2020.
Voirin et al., "Functionalization of cardanol: towards biobased polymers and additives", Polym. Chem. (2014) 5:pp. 3142-3162.
Notice of Allowance received in U.S. Appl. No. 16/128,971 dated Aug. 19, 2020.

* cited by examiner

*Primary Examiner* — Robert C Boyle
(74) *Attorney, Agent, or Firm* — Troutman Pepper Hamilton Sanders LLP

(57) ABSTRACT

Embodiments provided herein, relate to, in part, oxidative degradation of Cashew Nut Shell Liquid (CNSL) derivatives methods for making the same, and uses thereof, including embodiments relating to coatings, varnishes, adhesives compositions, polyurethane systems, thermoplastic and thermoset polymers and the like.

14 Claims, 3 Drawing Sheets

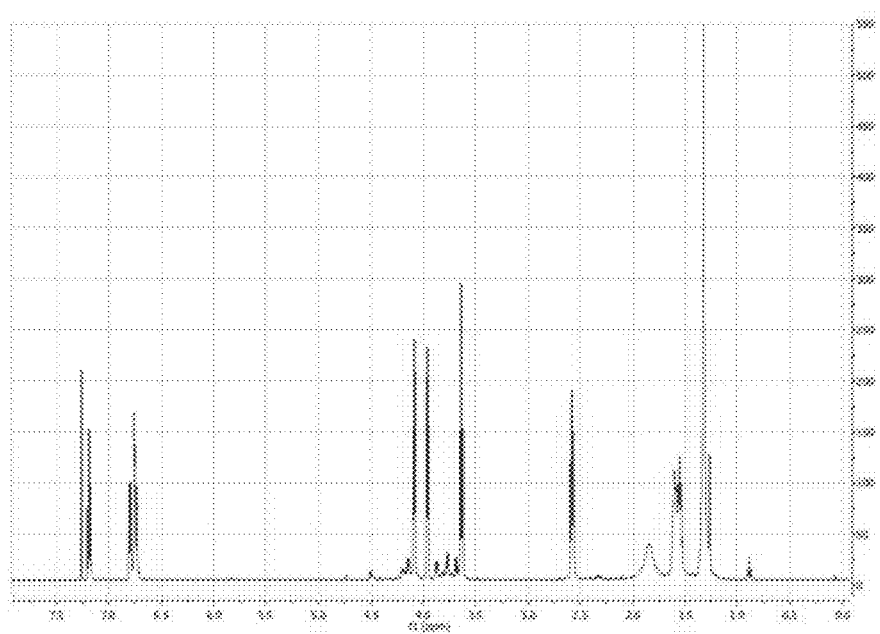
FIG. 1: ¹H-NMR of 8-(3-(2-hydroxyethoxy)phenyl)octan-1-ol

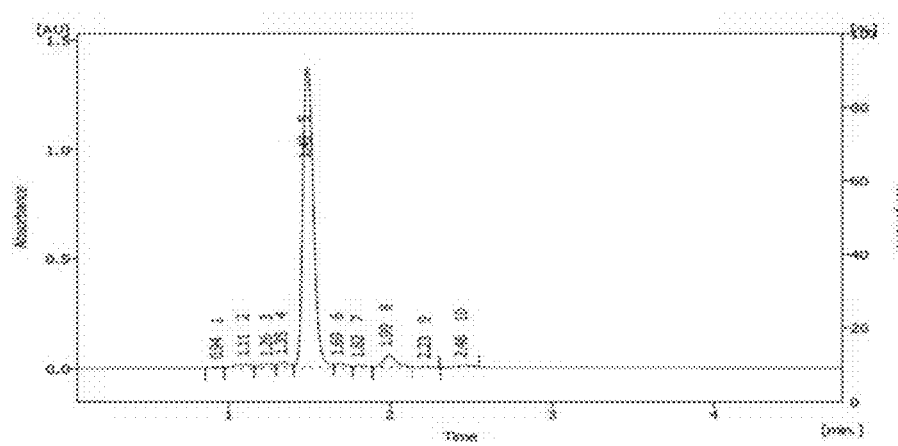
FIG. 2: HPLC profile of 8-(3-(2-hydroxyethoxy)phenyl)octan-1-ol
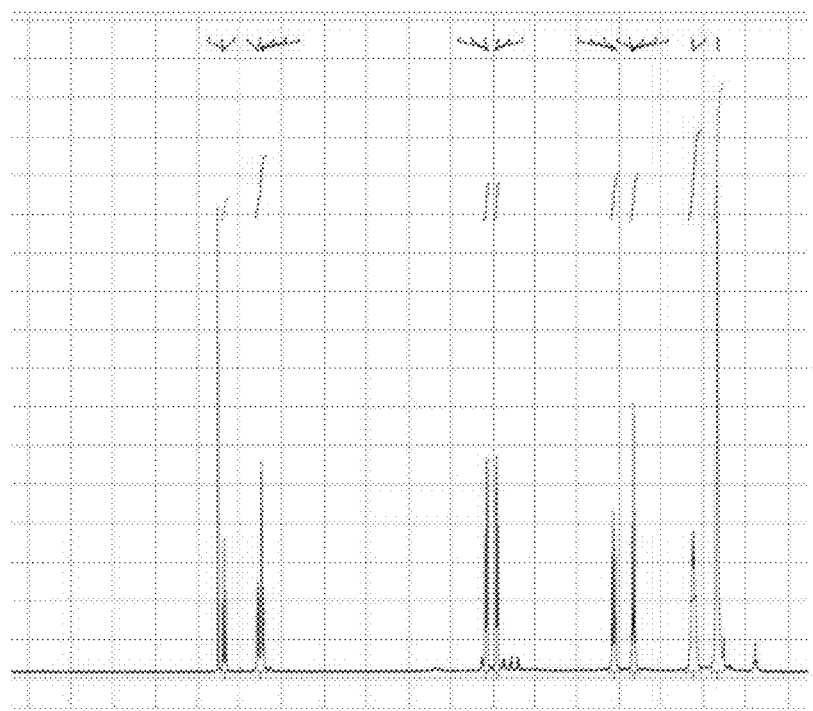
FIG. 3: ¹H-NMR of 8-(3-(2-hydroxyethoxy)phenyl)octanoic acid

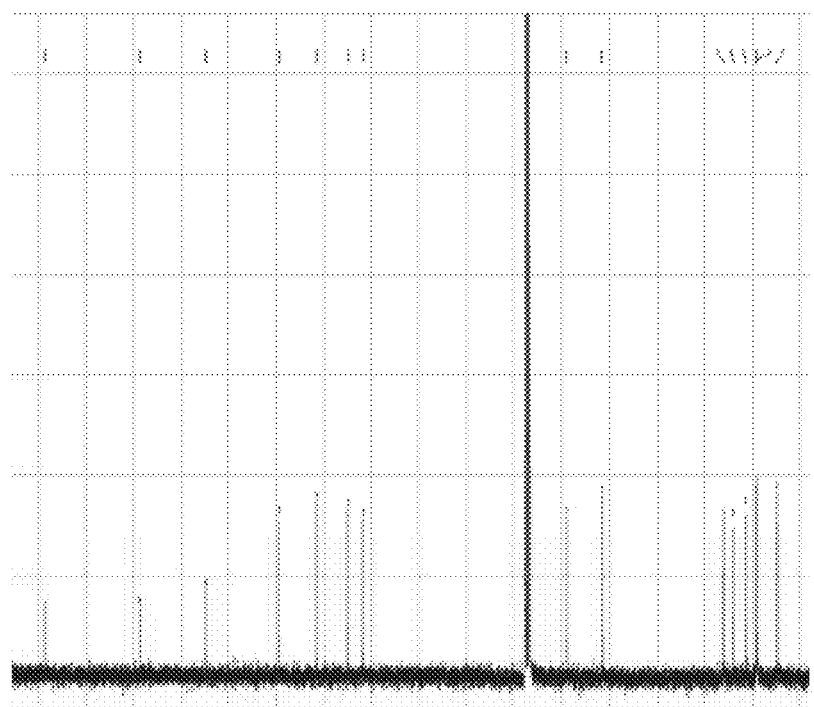
FIG. 4: $^{13}$C-NMR of 8-(3-(2-hydroxyethoxy)phenyl)octanoic acid
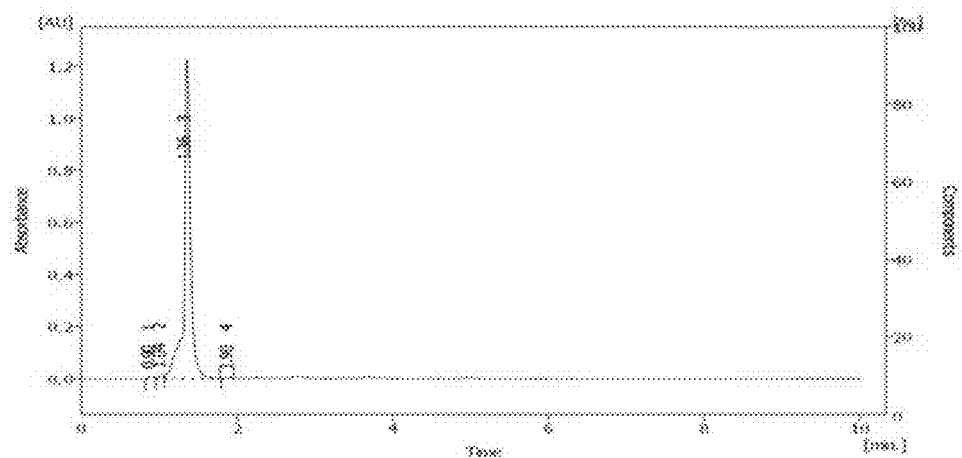
FIG. 5: HPLC profile of 8-(3-(2-hydroxyethoxy)phenyl)octanoic acid

OXIDIZED CASHEW NUT SHELL LIQUID DERIVATIVES AND USES THEREOF

CROSS-REFERENCE TO RELATED APPLICATIONS

This application claims priority under 35 U.S.C. § 119 to U.S. Provisional Application No. 62/577,804, filed Oct. 27, 2017, which is hereby incorporated by reference in its entirety.

BACKGROUND

Cashew Nut Shell Liquid (CNSL) is a well-known non-edible natural oil obtained as a by-product of the *Anacardium Occidentale* nut. CNSL is a non-food chain industrial oil found in the honeycomb structure of the cashew (*Anacardium Occidentale*) nutshell, typically considered a by-product of the cashew nut industry. The main product isolated by vacuum distillation of CNSL under proper conditions, is cardanol, an alkenyl-phenolic product with an average number of two unsaturations on the $C_{15}$ side-chain, as shown in a compound of Formula A.

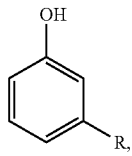

wherein R can be, for example:

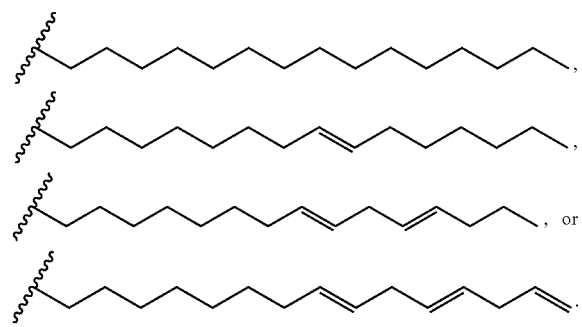

Although ozonization has been applied on Cashew Nut Shell Liquid (see, Durrani, A. A.; Sun, G. C.; Tyman, J. H. P. *Lipids* (1982), 17, 8, 561-569; b) Graham, M. B.; Tyman, J. H. P. *J. Am. Oil. Chem. Soc.* (2002), 79, 7, 725-732); Reddy, N. S.; Rao, A. S.; Chari, M. A.; Kumar, V. R.; Jyothi, V.; Himabindu, V. *Int. J. Org. Chem.* (2011), 1, 167-175), (dos Santos, M. L.; de Magalhaes, G. C. *J. Braz. Chem. Soc.* (1999), 10, 1, 13-20); (Lokman Khan, M.; Tomkinson, J.; Salisbury, R. J. U.S. Pat. No. 7,074,872); Lokman Khan, M.; Tomkinson, J.; Salisbury, R. J. US20020004576), (Varma, A. J.; Sivaram, S. U.S. Pat. No. 6,451,957), Vijayanathan, V.; Prasad, V. S.; Pillai, C. K. S. *J. App. Polym. Sci.* (2001), 82, 1021-1029; b) Pillai, C. K. S.; Sherrington, D. C.; Sneddon, A. *Polymer* (1992), 33, 18, 3968-3970) Nunes Lemes, L. F.; de Andrade Ramos, G.; Souza de Oliveira, A. et. al. *Eur. J. Med. Chem.* (2016), 108, 7, 687-700), each of which is incorporated by reference in its entirety, however, none of the CNSL substrates subjected to the ozonization step bear functional groups. Accordingly, there is a need for compositions and methods for making cardanol derivatives with functional groups. The present disclosure satisfies these needs as well as others that will readily apparent to one of skill in the art.

SUMMARY

In some embodiments, a compound of Formula I is provided:

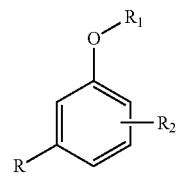

wherein:
R is

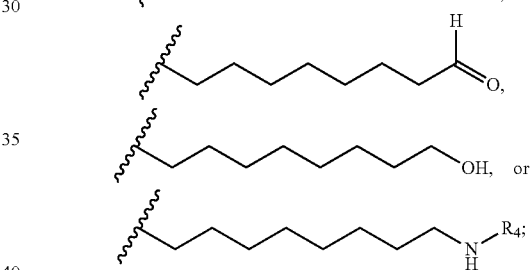

$R_1$ is hydrogen, epoxy, substituted or non-substituted alkyl, alkoxy, ether or ester group; and; $R_2$ is hydrogen, an alkyl, an aryl, an arylalkyl, or an acetyl group; $R_3$ is hydrogen, methyl, ethyl, or isopropyl; and $R_4$ is a linear, substituted or non-substituted aliphatic chain, branched, substituted or non-substituted aliphatic chain, substituted or non-substituted cycloaliphatic, substituted or non-substituted aromatic, or substituted or non-substituted polyether.

In some embodiments, the compound of Formula I is provided as

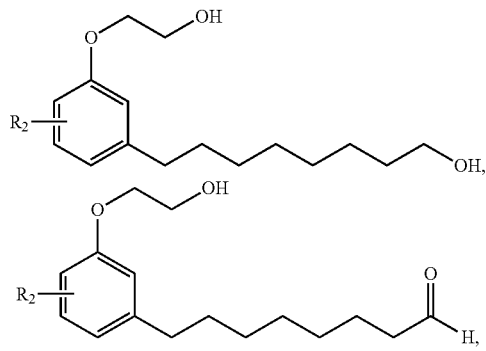

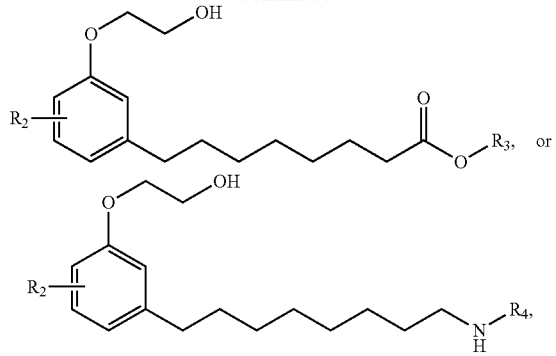

wherein $R_2$, $R_3$, and $R_4$ are as defined herein, such as in claim 1.

In some embodiments, the compound of Formula I is provided as

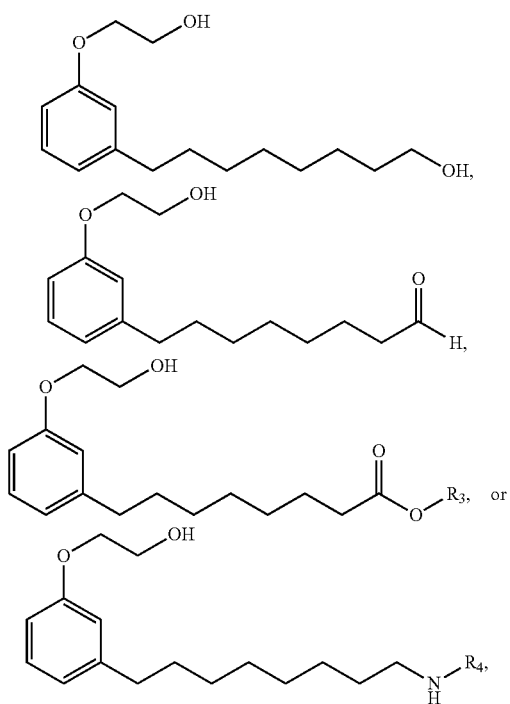

wherein $R_3$ and $R_4$ are as defined herein, such as in claim 1.

In some embodiments, methods of preparing the compounds are provided. In some embodiments, the method comprises contacting a cardanol-derivative with potassium permanganate, potassium peroxy-mono-sulfate and ozone under sufficient conditions to produce the compound. In some embodiments, the cardanol-derivative has a formula of:

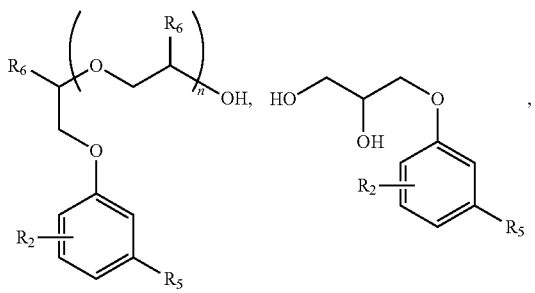

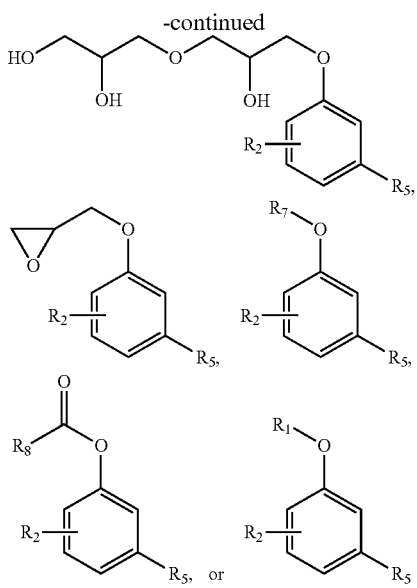

where
n is 0-11;
$R_1$ is hydrogen, epoxy, substituted or non-substituted alkyl, alkoxy, ether or ester group;
$R_2$ is hydrogen, an alkyl, an aryl, an arylalkyl, or an acetyl group
$R_5$ is:

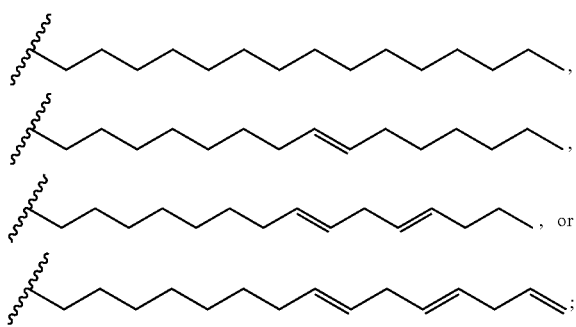

$R_6$ is H or —$CH_3$;
$R_7$ is —$CH_3$ or $CH_3CH_2CH_2CH_2$—; and
$R_8$ is $CH_3$ or $CH_3CH_2CH_2$—.

In some embodiments, the derivative has the formula of:

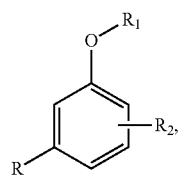

wherein R can be:

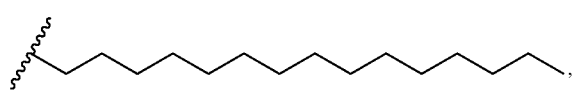

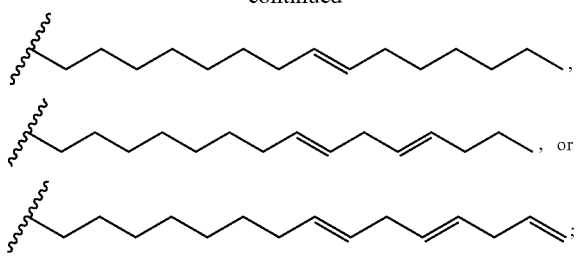

and

R₁ is an epoxy, substituted or non-substituted alkyl, alkoxy, ether or ester group and R₂ is hydrogen, an alkyl, an aryl, an arylalkyl, or an acetyl group In some embodiments, the compounds described herein can be used in methods that use reactive di-functional diluents or as raw materials for the production of thermosetting and thermoplastic polymers (including the ones suitable for 3D printing), in combination with petro-based or bio-derived raw materials, without any limitation thereof.

In some embodiments, a polymer of Formula X is provided as

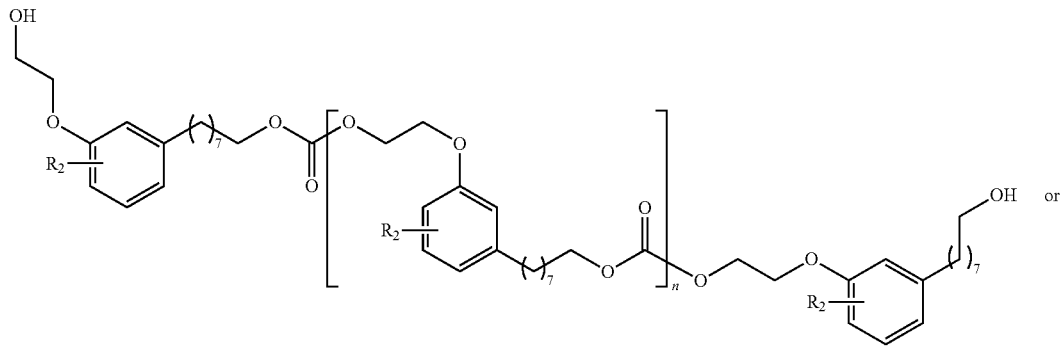

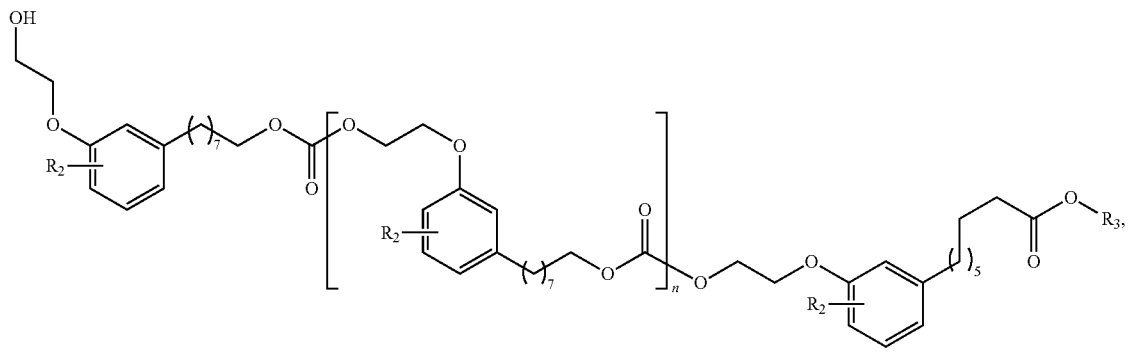

wherein each n is independently 1-100.

In some embodiments, the polymer of Formula X is provided as

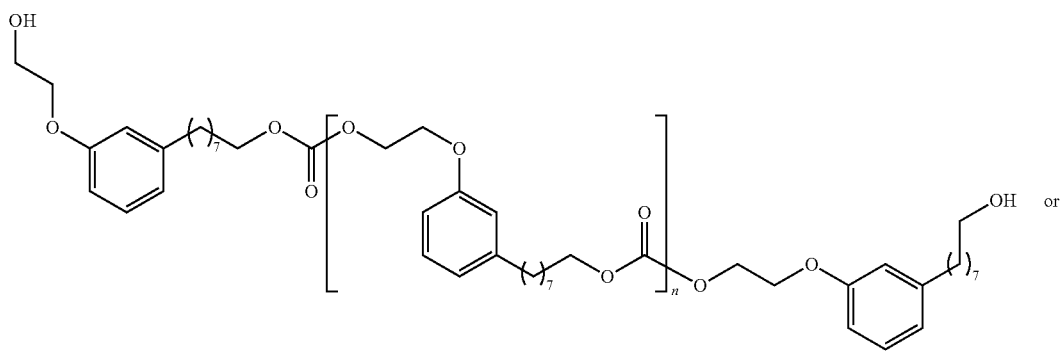

-continued

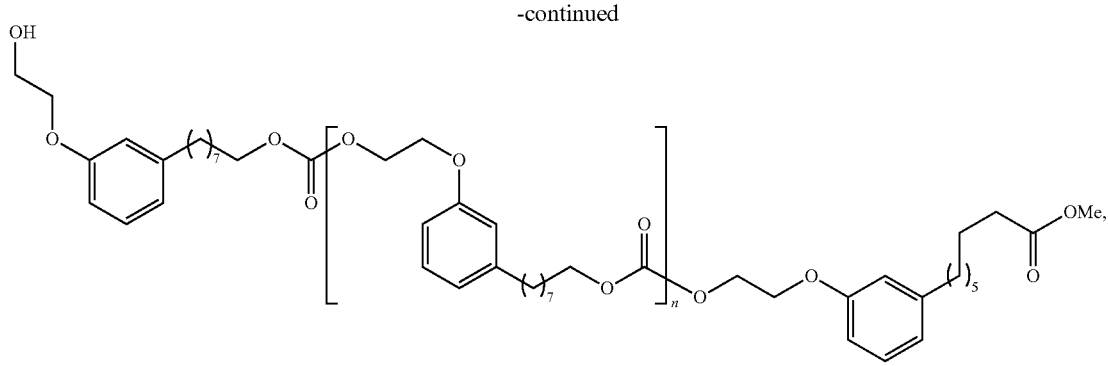

wherein each n is independently 1-100.

BRIEF DESCRIPTION OF FIGURES

FIG. 1 illustrates an exemplary $^1$H-NMR of 8-(3-(2-hydroxyethoxy)phenyl)octan-1-ol.

FIG. 2 illustrates an exemplary HPLC profile of 8-(3-(2-hydroxyethoxy)phenyl)octan-1-ol.

FIG. 3 illustrates an exemplary $^1$H-NMR of 8-(3-(2-hydroxyethoxy)phenyl)octanoic acid.

FIG. 4 illustrates an exemplary $^{13}$C-NMR of 8-(3-(2-hydroxyethoxy)phenyl)octanoic acid.

FIG. 5 illustrates an exemplary HPLC profile of 8-(3-(2-hydroxyethoxy)phenyl)octanoic acid.

DETAILED DESCRIPTION

Embodiment disclosed herein relate, in part, to the synthesis of cardanol-based derivatives through the oxidative degradation of cardanol's alkenyl $C_{15}$ side chain. These compounds can be used, in some embodiments, as, for example, raw materials for the synthesis of polymers with different type of functionalities (e.g. epoxy, carboxylic, amino, acrylic) and properties, spacing from thermosetting to thermoplastic formulations (e.g. 3D printing applications). The compounds can also be used in different types of applications including, but not limited to, 1K and 2K adhesives, elastomers, coatings, epoxy formulations, polyurethanes, thermoplastics, and the like. At the same time, reaction by-products deriving from $C_{15}$ side chain degradation (e.g. short chain aliphatic esters, acids and alcohols) can be recovered, purified and re-used as raw materials, polymer building blocks, essences, and the like.

As used herein, the terms "a" or "an" means that "at least one" or "one or more" unless the context clearly indicates otherwise.

As used herein, the term "alkyl" means a saturated hydrocarbon group which is straight-chained or branched. An alkyl group can contain from 1 to 20, from 2 to 20, from 1 to 10, from 2 to 10, from 1 to 8, from 2 to 8, from 1 to 6, from 2 to 6, from 1 to 4, from 2 to 4, from 1 to 3, or 2 or 3 carbon atoms. Examples of alkyl groups include, but are not limited to, methyl (Me), ethyl (Et), propyl (e.g., n-propyl and isopropyl), butyl (e.g., n-butyl, t-butyl, isobutyl), pentyl (e.g., n-pentyl, isopentyl, neopentyl), hexyl, isohexyl, heptyl, 4,4-dimethylpentyl, octyl, 2,2,4-trimethylpentyl, nonyl, decyl, undecyl, dodecyl, 2-methyl-1-propyl, 2-methyl-2-propyl, 2-methyl-1-butyl, 3-methyl-1-butyl, 2-methyl-3-butyl, 2-methyl-1-pentyl, 2,2-dimethyl-1-propyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, and the like.

The terms "alkoxy", refer to an alkyl group, optionally substituted, that is bonded through an oxygen atom. For example, the term "alkoxy" means a straight or branched —O— alkyl group of 1 to 20 carbon atoms, including, but not limited to, methoxy, ethoxy, n-propoxy, isopropoxy, t-butoxy, and the like. In some embodiments, the alkoxy chain is from 1 to 10 carbon atoms in length, from 1 to 8 carbon atoms in length, from 1 to 6 carbon atoms in length, from 1 to 4 carbon atoms in length, from 2 to 10 carbon atoms in length, from 2 to 8 carbon atoms in length, from 2 to 6 carbon atoms in length, or from 2 to 4 carbon atoms in length.

As used herein, the term "about" means that the numerical value is approximate and small variations would not significantly affect the practice of the disclosed embodiments. Where a numerical limitation is used, unless indicated otherwise by the context, "about" means the numerical value can vary by ±10% and remain within the scope of the disclosed embodiments. Additionally, in phrase "about X to Y," is the same as "about X to about Y," that is the term "about" modifies both "X" and "Y."

As used herein, the phrase "optionally substituted" or "substituted or unsubstituted" means that substitution is optional and therefore includes both unsubstituted and substituted atoms and moieties. A "substituted" atom or moiety indicates that any hydrogen on the designated atom or moiety can be replaced with a selection from the indicated substituent groups, provided that the normal valency of the designated atom or moiety is not exceeded, and that the substitution results in a stable compound. For example, if a methyl group is optionally substituted, then 3 hydrogen atoms on the carbon atom can be replaced with substituent groups.

Examples of suitable optional substituents means a group that does not nullify the utility of the compounds described herein or the intermediates useful for preparing them. Examples of suitable substituents include, but are not limited to: $C_1$-$C_6$alkyl, $C_1$-$C_6$alkenyl, $C_1$-$C_6$alkynyl, $C_5$-$C_6$aryl, $C_1$-$C_6$alkoxy, $C_3$-$C_5$heteroaryl, $C_3$-$C_6$cycloalkyl, $C_5$-$C_6$aryloxy, —CN, —OH, oxo, halo, haloalkyl, —NO$_2$, —CO$_2$H, —NH$_2$, —NH($C_1$-$C_8$alkyl), —N($C_1$-$C_8$alkyl)$_2$, —NH($C_6$aryl), —N($C_5$-$C_6$aryl)$_2$, —CHO, —CO($C_1$-$C_6$alkyl), —CO(($C_5$-$C_6$)aryl), —CO$_2$(($C_1$-$C_6$)alkyl), and —CO$_2$(($C_5$-$C_6$)aryl). In some embodiments, the substitution is amine, such as a primary amine, an alcohol group, an aldehyde group, or a carboxylic group.

As used herein, the term, "compound" means all stereoisomers, tautomers, and isotopes of the compounds described herein.

As used herein, the terms "comprising" (and any form of comprising, such as "comprise", "comprises", and "comprised"), "having" (and any form of having, such as "have" and "has"), "including" (and any form of including, such as "includes" and "include"), or "containing" (and any form of containing, such as "contains" and "contain"), are inclusive or open-ended and do not exclude additional, unrecited elements or method steps.

Cashew Nut Shell Liquid (CNSL) is a natural occurring oil recovered as a non-edible by-product of the *Anacardium Occidentale* industry. CNSL consist of a mixture of different chemical moieties (anacardic acid, cardanol, 2-methyl-cardol, cardol), all of them characterized by the presence of a $C_{15}$ side chain in the meta-position or the aromatic ring. These side chain contains a number of unsaturation from 0 to 3.

In some embodiments, CNSL-derived monomers, with a purity varying from about 80% to about 99.5% or from about 90% to about 95%, are treated under strong oxidative conditions in order to shorten the $C_{15}$ side chain to a $C_8$ side chain. The methods can also be performed under specific conditions to, for example, introduce specific functional groups on the terminal position of the resulting $C_8$ side chain.

In some embodiments, CNSL-derivatives that can be used as the starting materials in the presently described methods can be alkoxylated cardanol such as, but not limited to, mono-ethoxylated cardanol LITE 2020 or UltraLITE 2020 available from Cardolite Corporation, USA, epoxidized cardanol, such as, but not limited to, Ultra LITE 513 or NC-513, which are both available from Cardolite Corporation, USA, alkylated cardanol where the phenoxy OH has been protected with aliphatic or aromatic substituents, cardanol-based hydrocarbon resins (like LITE 2100, LITE 2100R, both available from Cardolite Corporation, USA, as non-limiting examples). Ester groups linked to the phenoxy OH represent suitable raw materials as well. Other CNSL-derivatives can also be used.

Without being bound to any particular theory, one advantage of the methods and compounds described herein is the possibility to recover monomers with different type of functionalities that, in some embodiments, can be further reacted with other raw materials such as, but not limited to, petro-based or bio-derived ones. A non-limiting scheme is illustrated as follows.

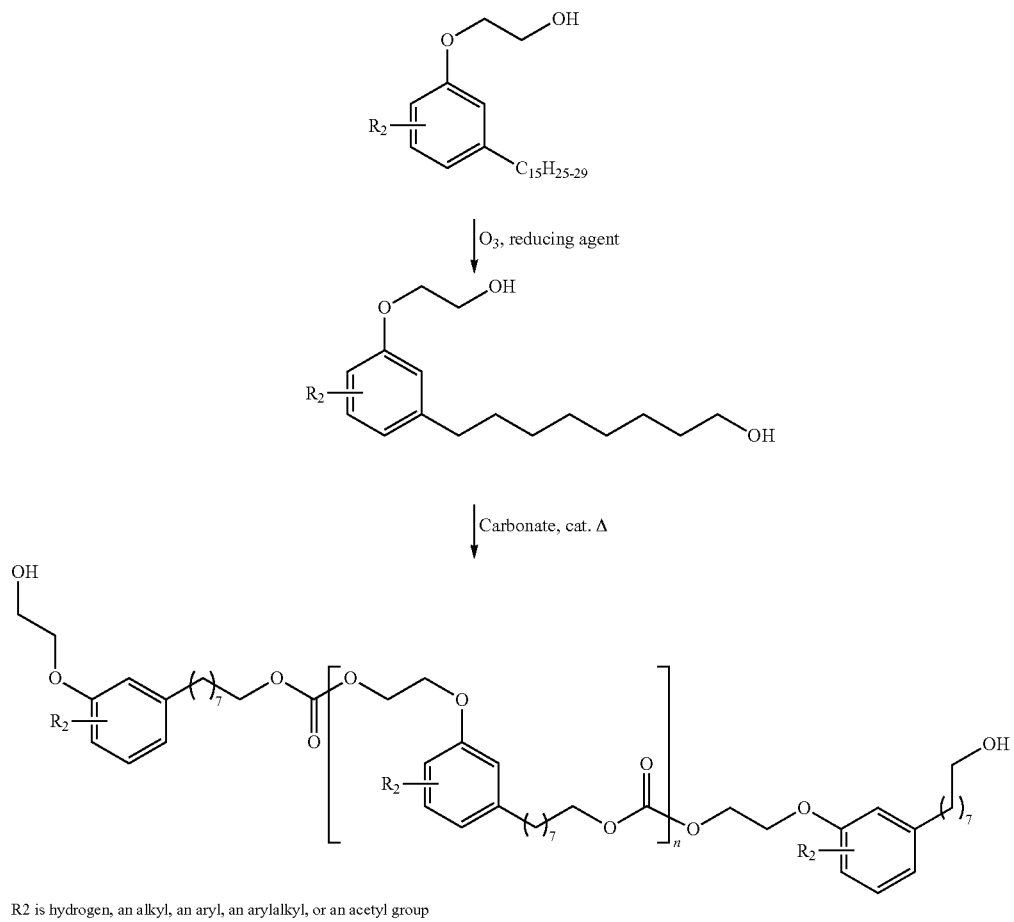

R2 is hydrogen, an alkyl, an aryl, an arylalkyl, or an acetyl group and n can be 1-100.

The scheme illustrates, in some embodiments, a general reaction scheme to polycarbonate polymers based on ozonized mono-ethoxylated cardanol derived diol 8-(3-(2-hydroxyethoxy)phenyl)octan-1-ol.

By tuning reaction conditions ozonized self-crosslinkable CNSL-derivatives can be obtained. A non-limiting example is illustrated where 8-(3-(2-hydroxyethoxy)phenyl)octanoic is used in the following scheme.

In some embodiments, the selected CNSL-derivatives are treated under oxidative conditions, by using, for example, potassium permanganate, potassium peroxy mono-sulfate and/or ozone, or any combination thereof. A non-limiting example is illustrated in the following scheme.

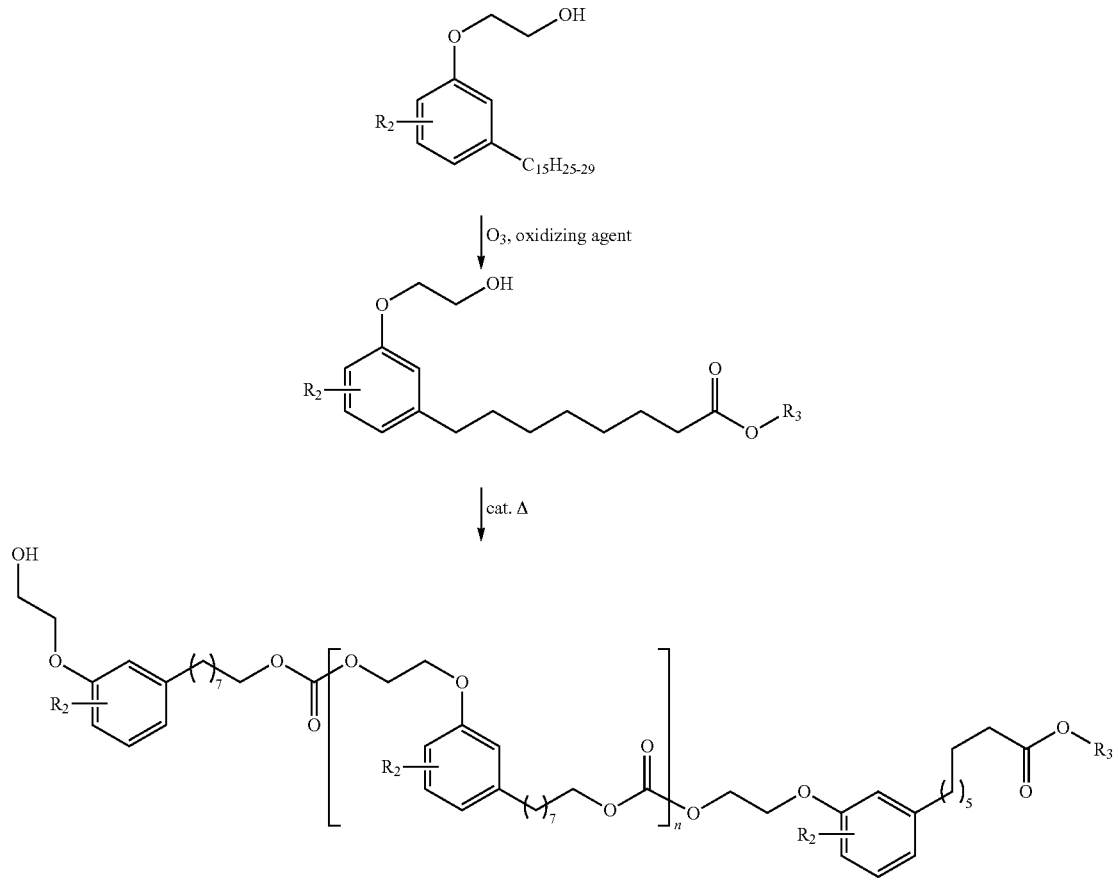

R3: H, Me, Et, i-Pr
R2 is hydrogen, an alkyl, an aryl, an arylalkyl, or an acetyl group and n can be 1-100.

This scheme illustrates a non-limiting embodiments showing a general reaction scheme to polymers based on self-crosslinkable ozonized mono-ethoxylated cardanol derived acid 8-(3-(2-hydroxyethoxy)phenyl)octanoic acid and/or its esters.

The ozonization reaction can be run under various conditions. For example, suitable process parameters to run the ozonization include the steps of generating ozone either from pure oxygen or (moisture-free) air, flushing the ozone through the substrate under stirring (discontinuous process) or through a column which is continuously feed of CNSL-substrate (continuous process). In embodiments where it is run through a column, the crude product is continuously recovered at the end of the column and treated to get the desired product.

In some embodiments, the continuous and discontinuous processes can be performed at a temperature of about −20° C. to about 50° C., about −15° C. to about 40° C., or about −5° C. to about 30° C.

In some embodiments, the ozone is flushed at a concentration between 20 and 60 g/hr, with a flow rate of about 2 to about 10 Liter/minute, or about 2 to about 6 Liter/minute.

In some embodiments, a solvent is used to reduce viscosity, promote the reaction and avoid the accumulation of potentially hazardous side products. Non-limiting examples of appropriate solvents include polar aprotic solvents (chlorinated solvents, acetonitrile, ethers, acetone, methyl ethyl ketone, methyl-isobutyl ketone, and the like), polar protic solvents (alcohols, water, carboxylic acids, and the like) and any combination thereof.

The resulting ozonides can be further reacted to produce the final compounds. For example, mono-ethoxylated CNSL derived ozonides can be treated with a metal hydride (e.g. sodium borohydride) in an alcoholic solvent (e.g. methanol, ethanol, n-butanol, or isopropanol) to produce corresponding diol 8-(3-(2-hydroxyethoxy)phenyl)octan-1-ol, where an oxidative work-up (e.g. with aqueous sodium chlorite) allows the recovery of the mono-carboxylic acid 8-(3-(2-hydroxyethoxy)phenyl)octanoic acid. Other reactions can also be performed as known to one of skill in the art.

In some embodiments, the resulting crude products can be further purified by standard technologies like chromatography, crystallization, solvent extraction, membrane filtration, ion exchange resins, or any combination thereof.

In some embodiments, the CNSL-ozonized derivatives can be converted to homopolymers (as in the case of (carboxy-alkyl)alkoxylated-phenol), di-functional epoxy monomers (by reacting 8-(3-(2-hydroxyethoxy)phenyl)octan-1-ol with epichlorohydrin), UV-crosslinkable structures (obtained by introducing acrylic or methacrylic groups on 8-(3-(2-hydroxyethoxy)phenyl)octan-1-ol hydroxyls), polyesters (e.g. by self-reacting 8-(3-Oxiranylmethoxy-phenyl)-octanoic acid obtained from the ozonization of mono-epoxidized cardanol), caprolactone-based polyesters (e.g. reacting ε-caprolactone with 8-(3-(2-hydroxyethoxy)phenyl)octan-1-ol as a initiator). These compounds can also be used to synthesize acrylated and methacrylated products, epoxy derivatives, polycarbonate diols, polyester diols, polyether diols, isocyanate-based prepolymers curing agents, thermoplastic polymers, or any combination thereof. These are non-limiting examples and other polymers or compounds/compositions can be formed from the compounds described herein.

In some embodiments, the reaction by-products derived from the C15 side chain degradation such as, but not limited to, short chain aliphatic esters, acids and alcohols, can be recovered, and/or purified (e.g. by fraction vacuum distillation) and re-used as raw materials, polymer building blocks, essences, and the like. Accordingly, in some embodiments, a compound of Formula I is provided:
wherein:

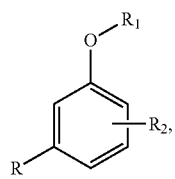

I

R is

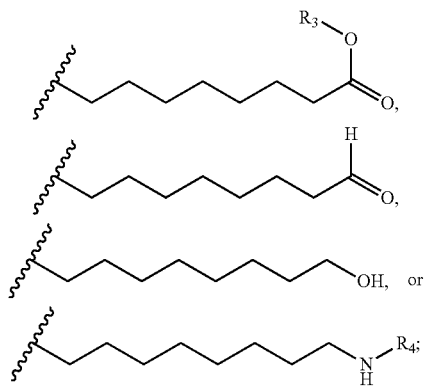

$R_1$ is hydrogen, an epoxy, substituted or non-substituted alkyl, alkoxy, ether or ester group;

$R_2$ is hydrogen, an alkyl, an aryl, an arylalkyl, or an acetyl group;

$R_3$ is hydrogen, methyl, ethyl, or isopropyl; and $R_4$ is a linear, substituted or non-substituted aliphatic chain, branched, substituted or non-substituted aliphatic chain, substituted or non-substituted cycloaliphatic, substituted or non-substituted aromatic, or substituted or non-substituted polyether.

In some embodiments, the compound of Formula I is provided as

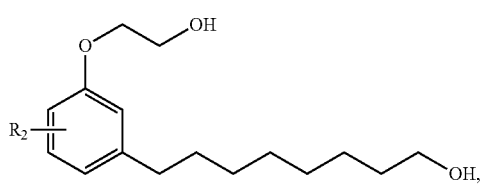

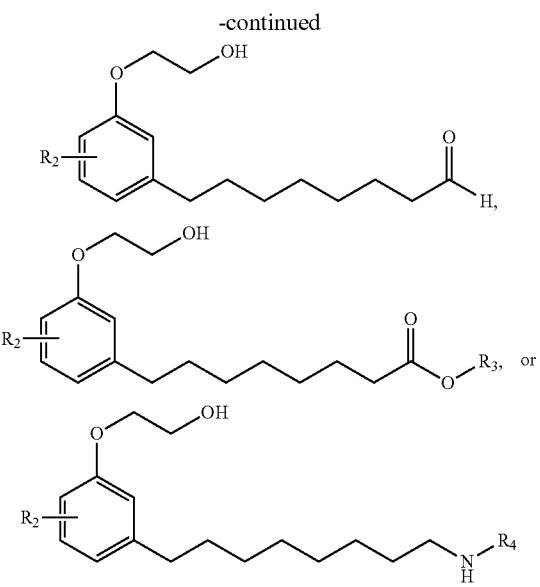

wherein $R_2$, $R_3$, and $R_4$ are as defined herein, such as above or as in as-filed claim 1.

In some embodiments, the compound of Formula I is provided as

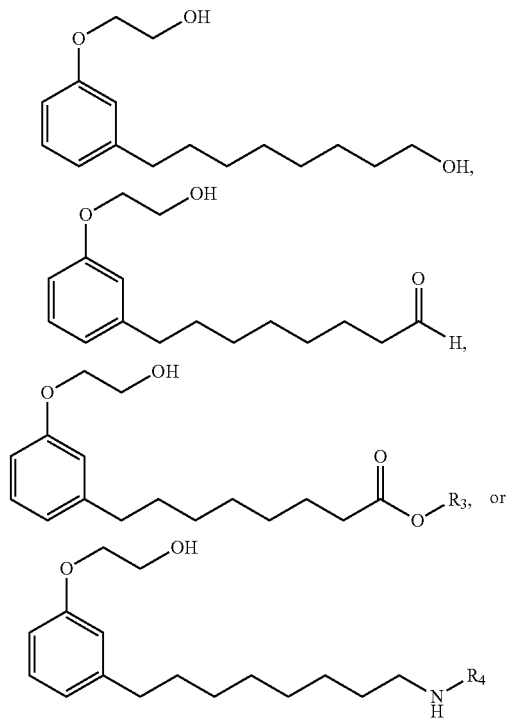

wherein $R_3$ and $R_4$ are defined herein, such as above, or as in the as-filed claim 1.

In some embodiments, methods of preparing a compound of Formula I is provided. In some embodiments, the methods comprise contacting a cardanol-derivative with potassium permanganate and ozone under sufficient conditions to produce the compound. The sufficient conditions are described herein or known to one of skill in the art.

In some embodiments, the cardanol-derivative has a formula of

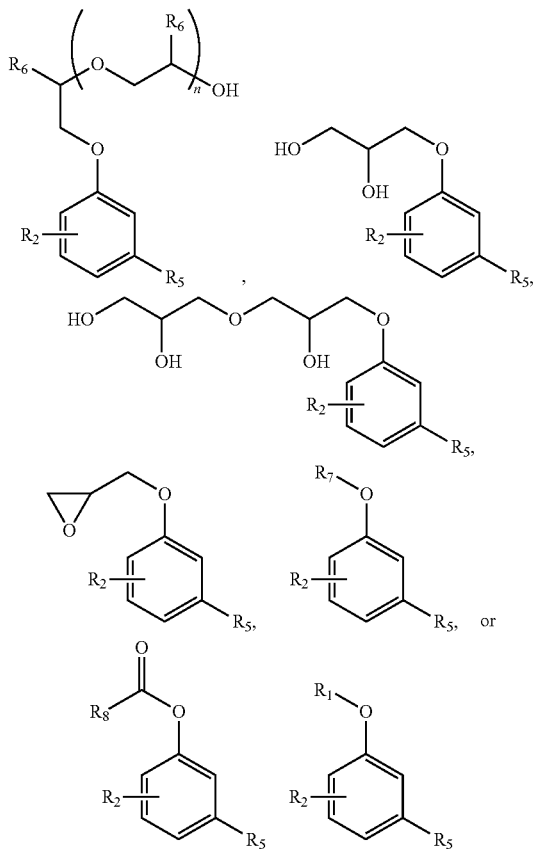

wherein:

n is 0-11;

$R_1$ is hydrogen, epoxy, substituted or non-substituted alkyl, alkoxy, ether or ester group;

$R_2$ is hydrogen, an alkyl, an aryl, an arylalkyl, or an acetyl group $R_5$ is:

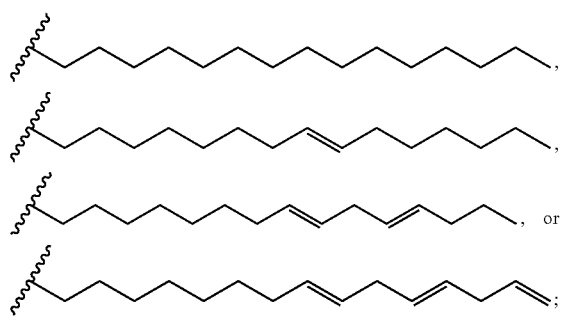

$R_6$ is H or —$CH_3$;

$R_7$ is —$CH_3$ or $CH_3CH_2CH_2CH_2$—; and $R_8$ is —$CH_3$ or $CH_3CH_2CH_2$—.

As described herein, the ozone can be contacted with the cardanol-derivative in a continuous process, a discontinuous process, or a combination thereof. In some embodiments, the derivative used as substrate in the ozonization process is a Cashew Nut Shell Liquid derived product. In some embodiments, the substrate has the formula of

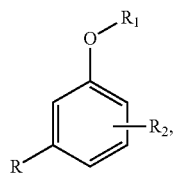

wherein R can be, for example:

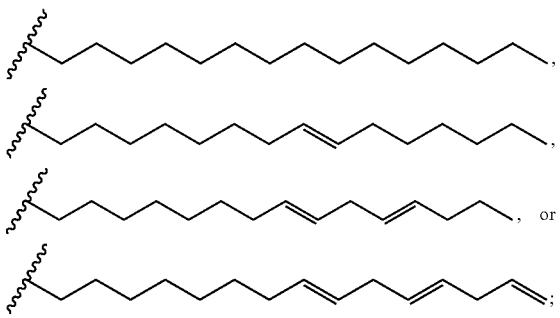

and $R_1$ is an epoxy, substituted or non-substituted alkyl, alkoxy, ether or ester group and $R_2$ is hydrogen, an alkyl, an aryl, an arylalkyl, or an acetyl group. In some embodiments, the ozone is contacted with the compound as a solution comprising ozone. In some embodiments, the solution is alcohol, water, or a carboxylic acid solution. Examples of alcohols include, but are not limited to, methanol, ethanol, n-butanol, isopropanol, and the like, or any combination thereof. In some embodiments, the carboxylic acid solution acetic acid, formic acid or a combination thereof. In some embodiments, the ozone is contacted with the cardanol-derivative at a flow rate of about 1 to 10 Liter/minute. In some embodiments, the ozonization is performed at a temperature of about −20° C. to about +50° C. or, in some embodiments, as described elsewhere herein.

In some embodiments, the methods further comprise contacting the ozonizated cardanol-derivative with an inorganic hydride to produce a compound of having the formula of:

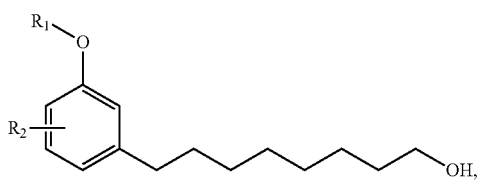

wherein $R_1$ and $R_2$ are as defined herein, such as above, or in the as-filed claims.

Various inorganic hydrides can be used and would be suitable. Examples of such hydrides include, but are not limited to, sodium borohydride, lithium aluminum hydride, di-alkyl-hydride, or any combination thereof.

In some embodiments, the method comprises reducing the ozonizated cardanol-derivative by catalytic hydrogenation to produce the compound of Formula I with a hydroxyl or aldehyde group. In some embodiments, the compound that is produced has a formula of

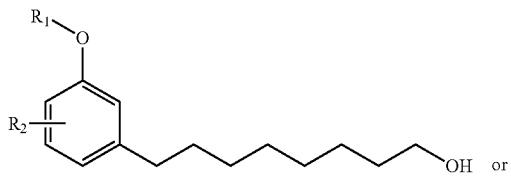

-continued

and $R_1$ and $R_2$ are defined herein, such as above, or in the as-filed claims, such as the as-filed claim 1.

In some embodiments, the ozonizated cardanol-derivative is contacted with a reducing agent to produce the compound of Formula I with an aldehyde group. In some embodiments, the compound that is produced has a formula of:

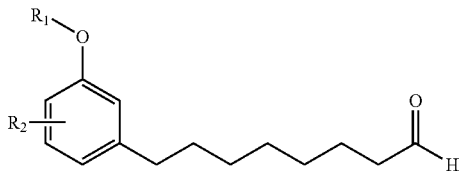

and $R_1$ and $R_2$ are as defined herein or as exemplified in the as-filed claims, such as claim 1. In some embodiments, the reducing agent is selected from the group consisting of triphenylphosphine; triethylamine; sodium, potassium or calcium iodide in presence of acetic acid; dimethyl sulfide; trimethylphosphate; thiourea; zinc/acetic acid mixture; or any combination thereof.

In some embodiments, the methods further comprise contacting the ozonizated cardanol-derivative in a solvent with an oxidizing agent to produce the compound of Formula I with a carboxy group. In some embodiments, the solvent is selected from the group consisting of water, methanol, ethanol, and isopropanol. In some embodiments, the compound of Formula I with a carboxy group has a formula of:

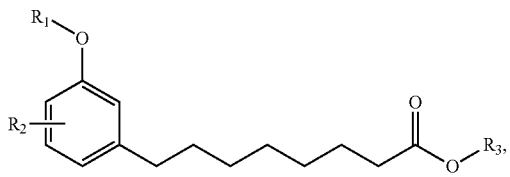

and $R_1$ and $R_2$ and $R_3$ are as defined herein, such as above, or as in the as-filed claims, such as claim 1. In some embodiments, the oxidizing agent is selected from the group consisting of oxone, potassium permanganate, in situ generated peracids, potassium bi-chromate, sodium chlorite, potassium peroxy mono-sulfate, or oxygen, or any combination thereof.

In some embodiments, the methods further comprise performing a reductive amination step on the compound of Formula I that comprises an aldehyde group to produce a compound with a substituted secondary amine, the reductive animation step comprising contacting the compound of Formula I that comprises an aldehyde group with a primary amine to product a compound of Formula Ia:

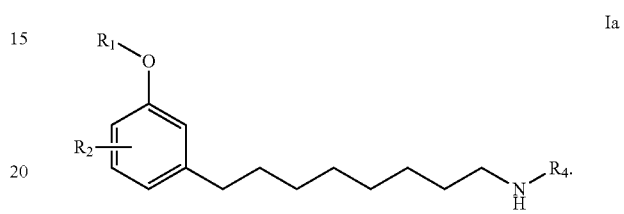

wherein:

$R_1$ and $R_2$ are as defined herein, such as above, or as shown in the as-filed claims; such as claim 1.

$R_4$ is a substituted or non-substituted linear or cyclic aliphatic chain, a substituted or unsubstituted aromatic ring, or a linear polyether chain. In some embodiments, $R_4$ is substituted with an amine group. In some embodiments, $R_4$ is a mono- and multifunctional aliphatic primary amine (e.g. butylamine, diisobutylamine, octylamine, and the like), a mono- and multifunctional cycloaliphatic primary amine (e.g. cyclohexylamine, isophorone diamine, and the like), mono- and multifunctional aromatic primary amine (e.g. aniline, meta-xylene diamine, and the like), polyetheramines, alkanolamine (e.g. ethanolamine and the like), or any combination thereof.

In some embodiments, the primary amine is ammonia, mono- and multifunctional aliphatic primary amines (e.g. butylamine, diisobutylamine, octylamine, and the like), mono- and multifunctional cycloaliphatic primary amines (e.g. cyclohexylamine, isophorone diamine, and the like), mono- and multifunctional aromatic primary amines (e.g. aniline, meta-xylene diamine, and the like), polyetheramines, alkanolamine (e.g. ethanolamine and the like), or any combination thereof.

The products can also be purified. In some embodiments, the products are purified by chromatography, distillation, crystallization, membrane filtration, ion exchange resin, or any combination thereof.

In some embodiments, a polymer of Formula X is provided as

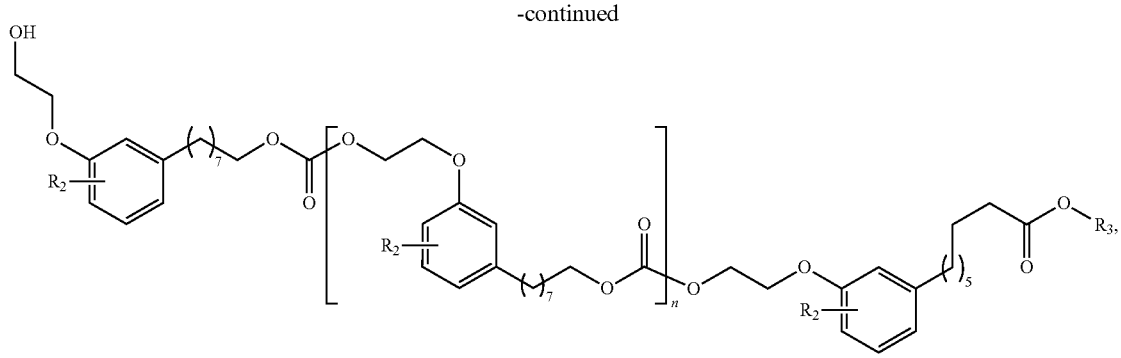

wherein each n is independently 1-100.

In some embodiments, the polymer of Formula X is provided as

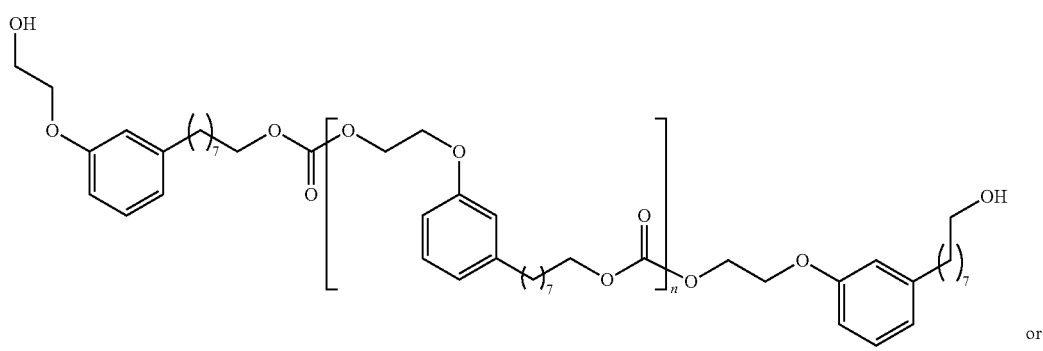

or

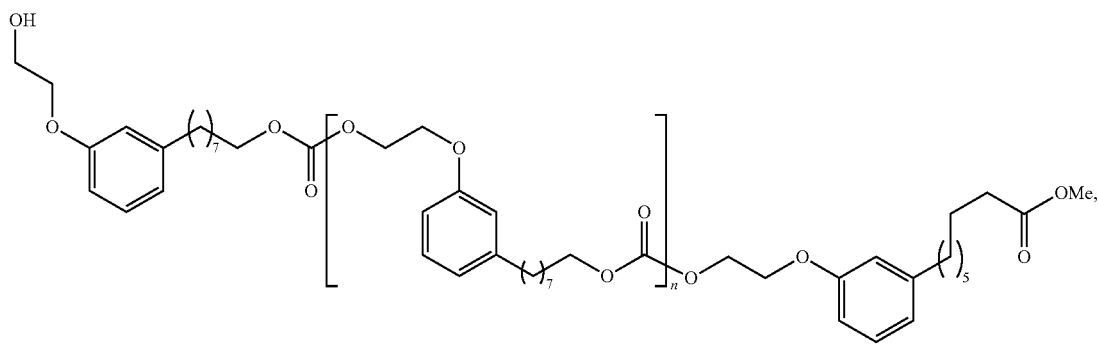

wherein each n is independently 1-100.

Other aspects and advantages of these compounds and methods will be apparent to those skilled in the art. Experimental details are provided in the following examples, which are provided by way of illustration only and should not be construed to limit the disclosure or the appended claims.

EXAMPLES

Example 1. General Procedure for LITE 2020 Ozonization—Method I

LITE 2020 (ethoxylated cardanol) (100 g, 0.29 mol), which has an average formula of

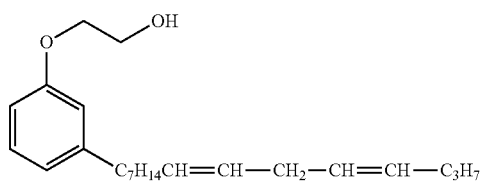

was dissolved in DCM/MeOH 4/3 (1 L), after addition of few drops of 0.1% Sudan Red III in acetone, the solution was cooled to 0° C. and treated with ozonized air until the color of the indicator was discharged. The ozonizer voltage was then set to zero and the reaction sparged for 10 min with air to remove residual ozone. The ozonized mixture is then work upped according to the needs without any purification.

Example 2. General Procedure for LITE 2020 Ozonization—Method II

LITE 2020 (ethoxylated cardanol) (100 g, 0.29 mol) was dissolved in Acetonitrile/water 90/10 (1 L), after addition of few drops of 0.1% Sudan Red III in acetone, the solution was cooled to 0° C. and treated with ozonized air until the color of the indicator was discharged. The ozonizer voltage was then set to zero and the reaction sparged for 10 min with air to remove residual ozone. The ozonized mixture is then work upped according to the needs without any purification.

Example 3. Synthesis of 8-(3-(2-hydroxyethoxy)phenyl)octan-1-ol

LITE 2020 (ethoxylated cardanol) (100 g, 0.29 mol) was ozonized according to General procedure—method I. The reaction mixture was diluted with MeOH (200 mL) and sodium borohydride (27 g, 0.71 mol) was added portion wise keeping the temperature <15° C. The reaction mixture was stirred for 2 h at room temperature, neutralized using HCl 2N and extracted with ethyl acetate (2×300 mL). The combined organic layers were washed with water, brine and dried over anhydrous sodium sulfate. The product was purified by steam distillation. The NMR of the product is illustrated in FIG. 1 and HPLC of the product is illustrated in FIG. 2.

Example 4. Synthesis of 8-(3-(2-hydroxyethoxy)phenyl)octanoic acid—1

LITE 2020 (100 g, 0.29 mol) was ozonized according to General procedure—method 2. The reaction mixture was slowly added with 4M aqueous sodium chlorite 4N (630 mL) keeping the temperature <15° C., the reaction mixture was stirred at room temperature for 12 h. The oxidation reaction was quenched with saturated aqueous sodium disulfite keeping the temperature <35° C. The mixture was extracted with ethyl acetate (700 mL), the organic layer was dried over anhydrous sodium sulfate and solvent removed under vacuum. The product was recovered as yellowish solid by precipitation using diethyl ether/petroleum ether. The NMR spectra of the products are illustrated in FIG. 3 ($^1$H-NMR) and FIG. 4 ($^{13}$C-NMR), while the HPLC chromatogram is illustrated in FIG. 5.

Example 5. Synthesis of 8-(3-(2-hydroxyethoxy)phenyl)octanoic acid—2

LITE 2020 (50 g, 0.15 mol) was ozonized according to General procedure—method 1. The reaction mixture was diluted with formic acid (250 mL) and slowly added with hydrogen peroxide 30% (250 mL). The reaction temperature was raised to 70° C. and the mixture stirred for 3 h. After cooling to room temperature water was added and the organic layer separated. The organic phase was repeatedly washed with water and brine, dried over anhydrous sodium sulfate and solvent removed under vacuum. The product was recovered as yellowish solid by precipitation using diethyl ether/petrol.

Example 6. Synthesis of 8-(3-(2-hydroxyethoxy)phenyl)octanoic acid methyl ester Mono-ethoxylated cardanol (50 g, 0.15 mol) was dissolved in methanol (500 mL). After addition of few drops of 0.1% Sudan Red III in acetone, the solution was cooled to 0° C. and treated with ozonized air until the color of the indicator was discharged. The ozonizer voltage was then set to zero and the reaction sparged for 10 min with air to remove residual ozone. The ozonized mixture was then warmed to 25° C. and added with Oxone® (120 g, 0.79 mol) under vigorous stirring. After 15 minutes the temperature was raised to 70° C. and stirring continued for 3 h. The solvent was then removed under vacuum, recovering the final product as a yellow oil that can be used without any further purification. If necessary, the crude product can be treated with a sodium bicarbonate saturated aqueous solution and extracted with ethyl acetate.

Example 7. Synthesis of a Polyester Polymer Based on 8-(3-(2-hydroxyethoxy)phenyl)octan-1-ol To a mixture of 8-(3-(2-hydroxyethoxy)phenyl)octan-1-ol (70 g, 0.5 mol) and stannous octoate (0.114 g) stirred at 90° C. under nitrogen atmosphere, ε-caprolacton (120.2 g, 2 mol) was added portion-wise. The resulting systems was then heated up and stirred under nitrogen at 160° C., monitoring acid value by titration. After 4 hours, system's temperature was increased to 190° C. and vacuum applied to remove any trace of unreacted ε-caprolacton. After cooling to room temperature, a polyester diol was recovered as a waxy pale brown solid.

Example 8. Synthesis of a Polyester Diol Based on 8-(3-(2-hydroxyethoxy)phenyl)octan-1-ol A mixture of 8-(3-(2-hydroxyethoxy)phenyl)octan-1-ol (70 g, 0.5 mol) and adipic acid (73.0 g, 0.5 mol) was stirred under nitrogen at 160° C. for 4 hours. Titanium(IV) tert-butoxide (0.15% w/w with respect to total raw material charge) was then added and the system left under stirring at 180° C. for further 4 hours. When acid value was <2 mg KOH/g, vacuum was then applied to remove any trace of residual water and the final product recovered as a brownish gummy material

Example 9. Synthesis of a Polyester Polymer Based on 8-(3-(2-hydroxyethoxy)phenyl)octanoic acid methyl ester 8-(3-(2-hydroxyethoxy)phenyl)octanoic acid methyl ester (100 g, 0.34 mol) was stirred under nitrogen at 80° C. and titanium(IV) tert-butoxide (0.15% w/w) was then added. The mixture was left under stirring at 160° C. for 2 hours, monitoring reaction conversion by GPC. When no evident trace of monomer was detected, vacuum was applied to remove any trace of volatiles and the final product recovered as a brown gummy material.

Example 10. Synthesis of a Poly-Lactic Acid Polymer Initiated by 8-(3-(2-hydroxyethoxy)phenyl)octan-1-ol L-lactide (400 g, 2.77 mol) is melted under nitrogen and stannous octoate (0.26 g, mol) is then added. The systems is stirred under nitrogen at 100° C. for 30 minutes. 8-(3-(2-hydroxyethoxy)phenyl)octan-1-ol (1.107 g, 4.16 mmol) is then added under nitrogen and the temperature increased to 150° C. The resulting mixture is stirred under nitrogen for 45 minutes keeping the temperature below 200° C., recovering the final product as a whitish solid that can be used without any further purification.

Various references and patents are disclosed herein, each of which are hereby incorporated by reference for the purpose that they are cited.

From the foregoing, it will be appreciated that various embodiments of the present disclosure have been described herein for purposes of illustration, and that various modifications can be made without departing from the scope and spirit of the present disclosure. Accordingly, the various embodiments disclosed herein are not intended to be limiting.

What is claimed is:

1. A compound of Formula I is

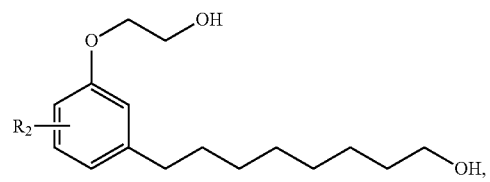

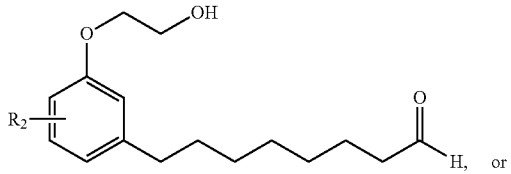

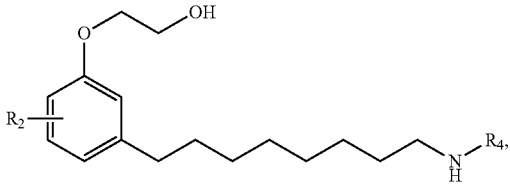

$R_2$ is hydrogen, an alkyl, an aryl, an arylalkyl, or an acetyl;

$R_4$ is a linear, substituted or non-substituted aliphatic chain, a branched, substituted or non-substituted aliphatic chain, a substituted or non-substituted cycloaliphatic chain, a substituted or non-substituted aromatic ring, or a substituted or non-substituted polyether chain.

2. The compound of claim 1, wherein the compound of Formula I is

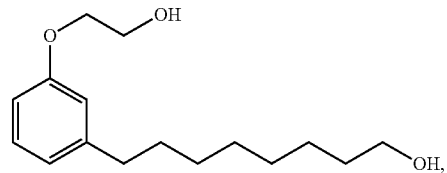

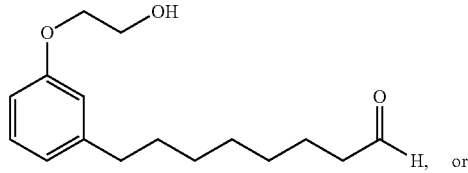

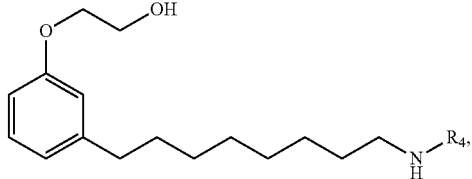

wherein and $R_4$ is defined as in claim 1.

3. A method for preparing the compound of claim 1, the method comprising contacting a cardanol-derivative with potassium permanganate, potassium peroxy mono-sulfate, and ozone, or any combination thereof under sufficient conditions to produce the compound.

4. The method of claim 3, wherein the derivative has the formula of:

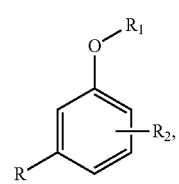

wherein R is:

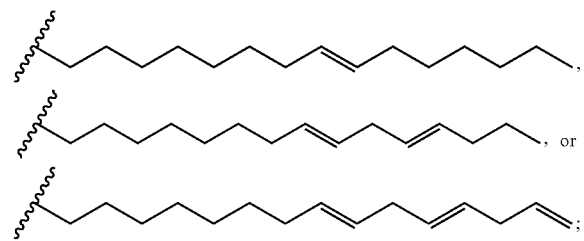

$R_1$ is $(CH_2)_2$—OH, and $R_2$ is hydrogen, an alkyl, an aryl, an arylalkyl, or an acetyl.

5. The method of claim 3, wherein the method further comprises contacting the ozonized cardanol-derivative with an inorganic hydride to produce a compound of having the formula of:

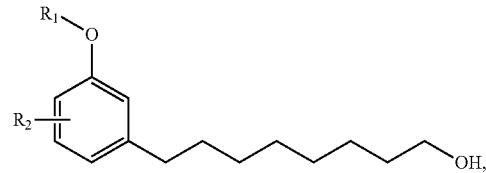

wherein $R_1$ is $(CH_2)_2$—OH and $R_2$ is defined as in claim 1; or the method further comprises reducing the ozonized cardanol-derivative by catalytic hydrogenation to produce the compound of Formula I with a hydroxyl or aldehyde group.

6. The method of claim 5, wherein the compound produced is

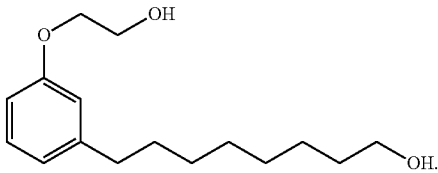 [SMILES: OCCCCCCCCc1cccc(OCCO)c1]

7. The method of claim 3, further comprising contacting the ozonizated cardanol-derivative with a reducing agent to produce the compound of Formula I with an aldehyde group.

8. The method of claim 7, wherein the compound has a formula of:

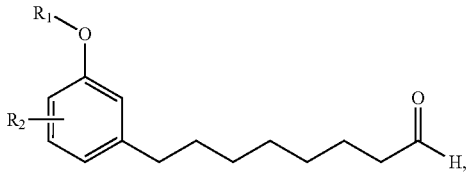

wherein $R_1$ is $(CH_2)_2$—OH and $R_2$ is defined as in claim 1.

9. The method of claim 7, wherein the reducing agent is selected from the group consisting of triphenylphosphine; sodium, potassium or calcium iodide in presence of acetic acid; dimethyl sulphide; trimethylphosphate; thiourea; zinc/acetic acid mixture; and any combination thereof.

10. The method of claim 3, further comprising a solvent wherein the solvent is selected from the group consisting of water, methanol, ethanol, and isopropanol.

11. The method of claim 3, further comprising an oxidizing agent wherein the oxidizing agent is selected from the group consisting of oxone, potassium permanganate, in situ generated peracids, potassium bi-chromate, sodium chlorite, potassium peroxy-mono-sulfate, oxygen, or any combination thereof.

12. The method of claim 7, further comprising performing a reductive amination step on the compound of Formula I that comprises an aldehyde group to produce a compound with a substituted secondary amine, the reductive animation step comprising contacting the compound of Formula I that comprises an aldehyde group with a primary amine to product a compound of Formula Ia:

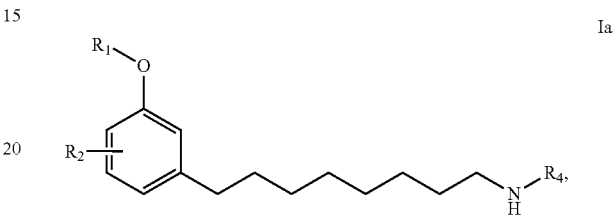

wherein:
$R_1$ is $R_1$ is $(CH_2)_2$—OH;
$R_2$ is hydrogen, an alkyl, an aryl, an arylalkyl, or an acetyl; and
$R_4$ is a substituted or non-substituted linear or cyclic aliphatic chain, a substituted or unsubstituted aromatic ring, or a linear polyether chain.

13. The method of claim 12, wherein $R_4$ is substituted with an amine group.

14. The method of claim 3, wherein the ozone is a solution comprising ozone.

* * * * *